United States Patent
Minaguchi et al.

(10) Patent No.: US 7,246,742 B2
(45) Date of Patent: Jul. 24, 2007

(54) METHOD FOR DISTRIBUTING FINANCIAL DATA

(75) Inventors: Hiroshi Minaguchi, Chuo-ku (JP); Yuichi Sato, Chuo-ku (JP); Kazuki Kurose, Chuo-ku (JP); Shusuke Shitara, Chuo-ku (JP)

(73) Assignee: Estijl Co., Ltd., Tokyo (JP)

( * ) Notice: Subject to any disclaimer, the term of this patent is extended or adjusted under 35 U.S.C. 154(b) by 169 days.

(21) Appl. No.: 11/178,387

(22) Filed: Jul. 12, 2005

(65) Prior Publication Data

US 2006/0015432 A1    Jan. 19, 2006

(30) Foreign Application Priority Data

Jul. 15, 2004    (JP)    ............... 2004-208804

(51) Int. Cl.
*G07F 19/00*    (2006.01)

(52) U.S. Cl. ............ 235/379; 235/377; 235/380; 705/34

(58) Field of Classification Search ............ 902/10, 902/22; 235/377, 376; 703/34
See application file for complete search history.

(56) References Cited

U.S. PATENT DOCUMENTS

| | | | |
|---|---|---|---|
| 5,878,032 A | 3/1999 | Mirek et al. | |
| 6,006,206 A | 12/1999 | Smith et al. | |
| 6,587,840 B1 | 7/2003 | Smith et al. | |
| 6,598,075 B1* | 7/2003 | Ogdon et al. | ............... 709/204 |
| 7,152,788 B2* | 12/2006 | Williams | ............... 235/380 |
| 2004/0063454 A1 | 4/2004 | Sasaki | |

FOREIGN PATENT DOCUMENTS

| | | |
|---|---|---|
| EP | 0 902 570 A2 | 3/1999 |
| JP | A 08-272859 | 10/1996 |
| JP | A 11-039400 | 2/1999 |
| JP | A 11-161715 | 6/1999 |
| JP | A 2001-028613 | 1/2001 |
| JP | A 2002-268962 | 9/2002 |
| JP | A 2002-288429 | 10/2002 |
| JP | A 2003-069588 | 3/2003 |
| JP | A 2004-046541 | 2/2004 |
| JP | A 2004-064387 | 2/2004 |
| JP | A 2004-072182 | 3/2004 |

* cited by examiner

*Primary Examiner*—Seung Ho Lee
(74) *Attorney, Agent, or Firm*—Oliff & Berridge, PLC

(57) ABSTRACT

The present invention is aimed to provide a system for providing, to a terminal device of an investor, data indicating delay of distribution of financial data, which data is used for the investor to make decisions on investment transactions in a simple and reliable way. To achieve the above aim, after entity 20 carries out specific processing of financial data received from financial data broadcasting device 10 to generate new financial data derived from the received financial data, entity 20 adds time data and an entity identifier for identifying entity 20 to the derived financial data and transmits the data to another entity 20 located at a downstream position or to financial data searching device 30.

3 Claims, 3 Drawing Sheets

METHOD FOR DISTRIBUTING FINANCIAL DATA

BACKGROUND OF THE INVENTION

1. Field of the Invention

The present invention relates to a technology for distributing financial data.

2. Description of the Related Art

In recent years, trading in various kinds of financial products, which are handled typically in negotiable securities markets, has generally been conducted electronically through computer networks. In trade conducted electronically, each investor connects his/her terminal device to a computer network, and, using financial data continuously distributed to his terminal device from data sources such as securities exchanges, makes decisions on timing and content of transactions.

Namely, each investor makes decisions on transactions on the basis of the content of the financial data distributed to his/her terminal device from data sources such as securities exchanges. Accordingly, each investor may be placed at a considerable financial disadvantage if financial data is not promptly received at his/her terminal device, since s/he may make wrong decisions based on out-of-date information. The below-mentioned Patent Document 1 discloses a system for avoiding problems which may be caused by such a delay in distribution of financial data. The system disclosed in Japanese Patent Application Laid-Open Publication Hei 11-161715 (referred to as 'JP11-161715' hereinafter) comprises a data source which stores financial data provided by securities exchanges, and a data collection sub-system which obtains financial data from the data source and distributes the financial data to terminal devices of investors. When the data collection sub-system obtains financial data from the data source, it determines whether the financial data is obtained in real-time or is out of date. When the data collection sub-system determines that the obtained financial data is out of date, it distributes a signal for updating status code, along with the out-of-date financial data, to terminal devices of investors. On the basis of the signal, an investor can correctly evaluate whether s/he should use the financial data presented at his/her terminal device to make a decision on investments.

SUMMARY OF THE INVENTION

In the above-explained system of electronic trading, financial data provided by securities exchanges reaches terminal devices of investors not directly, but through several computers known as 'entities', each entity having several software components for processing financial data which passes through the entity to value-added financial data. Namely, financial data which has greater value than the financial data received by the entity is created at the entity and distributed to terminal devices of investors, i.e. people who utilize the financial data.

However, in the system disclosed in JP 11-161715, only a computer that is located at the highest upstream position on a distribution route of financial data is able to evaluate a delay in the distribution of the financial data and to notify the delay to terminal devices of investors. Therefore, the investors cannot know the extent to which the distribution of financial data received by their terminal devices is delayed due to data processing at each entity on the distribution route. Accordingly, investors who use the system cannot know which entity causes a critical delay in distribution of financial data, and are therefore unable to select an alternative distribution route of financial data to circumvent the entity causing the critical delay.

The present invention addresses the above problems, and provides a technique for distributing financial data to terminal devices of investors along with data indicating delays in distribution of the financial data with regard to each entity on a distribution route so that each of the investors can reflect the delays when making decisions on investments.

In one aspect, the present invention provides a method for distributing financial data in a communication system having a data source from which financial data is transmitted, a terminal device receiving the financial data and displaying content of the financial data, and plural relays located between the data source and the terminal device for relaying the financial data, comprising: transmitting financial data from the data source to a first relay; adding to the financial data, at the first relay, a pair of time data indicating a current time which is obtained from an internal timer of the first relay and an entity identifier identifying the first relay; transmitting the financial data from the first relay to a second relay or to the terminal device; calculating, at the second relay or the terminal device which receives the financial data, a time period between a time indicated by the time data included in the financial data in a pair with the entity identifier of the first relay and a current time which is obtained from an internal timer of the second relay or the terminal device; and determining, at the second relay or the terminal device which receives the financial data, whether critical delay of distribution of the financial data occurred at the first relay by comparing the calculated time period and a predetermined threshold time period.

The above method for distributing financial data may further comprise: adding to the financial data, at the second relay which receives the financial data, a pair of time data indicating a current time which is obtained from an internal timer of the second relay and an entity identifier identifying the second relay; transmitting the financial data from the second relay to a third relay or to the terminal device; calculating, at the third relay or the terminal device which receives the financial data, a time period between a time indicated by the time data included in the financial data in a pair with the entity identifier of the first relay or of the second relay, and a current time which is obtained from an internal timer of the third relay or the terminal device; and determining, at the third relay or the terminal device which receives the financial data, whether critical delay of distribution of the financial data occurred at the first relay or at the second relay by comparing the calculated time period and a predetermined threshold time period.

Moreover, the above method for distributing financial data may further comprise: processing, at the second relay which receives the financial data, the financial data to generate derived financial data; adding to the derived financial data, at the second relay which receives the financial data, a pair of time data indicating a current time which is obtained from an internal timer of the second relay and an entity identifier identifying the second relay; transmitting the derived financial data from the second relay to a third relay or to the terminal device; calculating, at the third relay or the terminal device which receives the derived financial data, a time period between a time indicated by the time data included in the derived financial data in a pair with the entity identifier of the first relay or of the second relay, and a current time which is obtained from an internal timer of the third relay or the terminal device; and determining, at the third relay or the terminal device which receives the derived financial data, whether critical delay of distribution of the financial data or of the derived financial data occurred at the first relay or at the second relay by comparing the calculated time period and a predetermined threshold time period.

According to the present invention, data indicating delays caused at each entity in a route of distribution of financial data, together with financial data used by investors to make decisions on investments, is provided to entities or terminal devices of investors located downstream along the route of distribution of financial data.

BRIEF DESCRIPTION OF THE DRAWINGS

Embodiments of the present invention will be described in detail based on the following figures, wherein.

DETAILED DESCRIPTION OF THE INVENTION

Embodiment of the Invention

Below, description will be given of an embodiment of the present invention with reference to the drawings.

Figure 1:
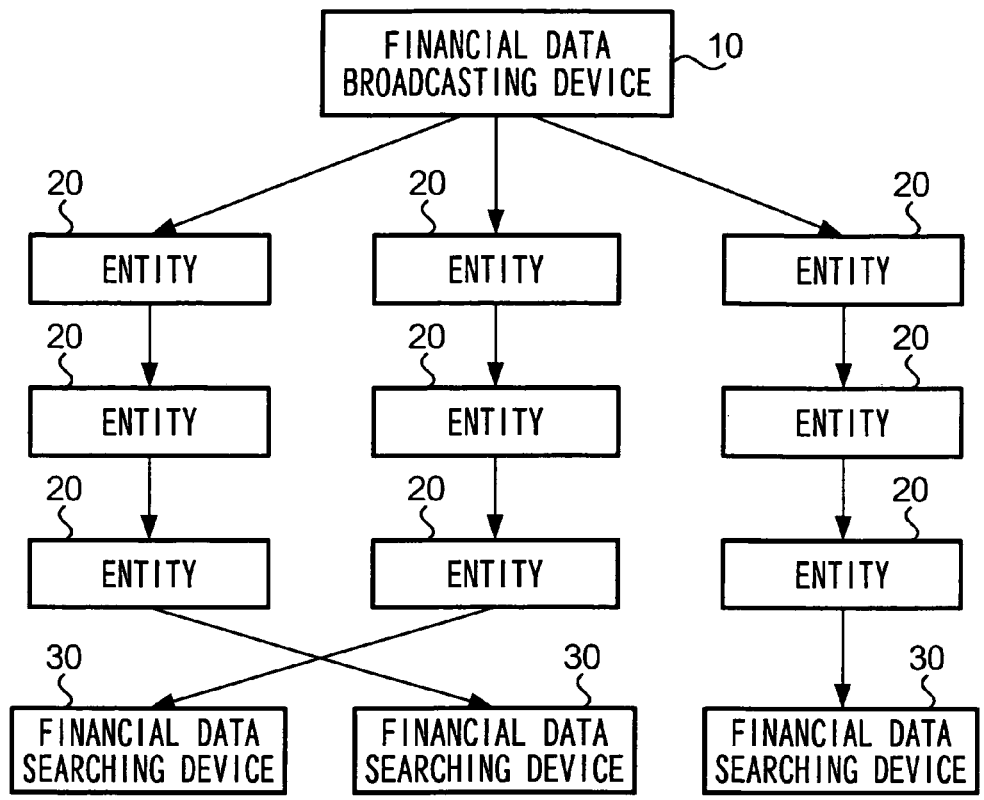
FIG. 1 illustrates an overall composition of a system according to an embodiment of the present invention.

FIG. 1 shows an overall configuration of a financial data distribution system according to an embodiment of the present invention. As shown in FIG. 1, the system comprises financial data broadcasting device 10, entities 20 and financial data searching devices 30, which are connected with one another directly or indirectly.

Each of the nodes, e.g. financial data broadcasting device 10, entities 20 and financial data searching devices 30, has a timer, and each of the timers of the nodes are adjusted to keep the correct time, with errors in an allowable range, by, for example, periodically accessing a time server through the Internet.

Financial data broadcasting device 10 is located in a securities exchange, and broadcasts data indicating contents of transactions carried out in the securities exchange as real-time financial data to entities 20 through a computer network.

Each of entities 20 is connected to financial data broadcasting device 10 and to financial data searching devices 30 directly or indirectly in the computer network, and relays financial data. Each of financial data searching devices 30 selects one of entities 20 and obtains financial data therefrom, and presents content of the obtained financial data. Each of financial data searching devices 30 also has a function for transmitting data for ordering specific transactions to a securities exchange. As shown in FIG. 1, in the system, plural entities 20 may exist between financial data broadcasting device 10 and one of financial data searching devices 30, and several routes for data distribution between financial data broadcasting device 10 and one of financial data searching devices 30 may be established using different sets of entities 20.

In the below explanation, when one entity 20 is located at a position closer to financial data broadcasting device 10 than another entity 20, the relation between the positions is expressed as 'one entity 20 is located at an upstream position of another entity 20' or 'another entity 20 is located at a downstream position of one entity 20'.

Figure 2:
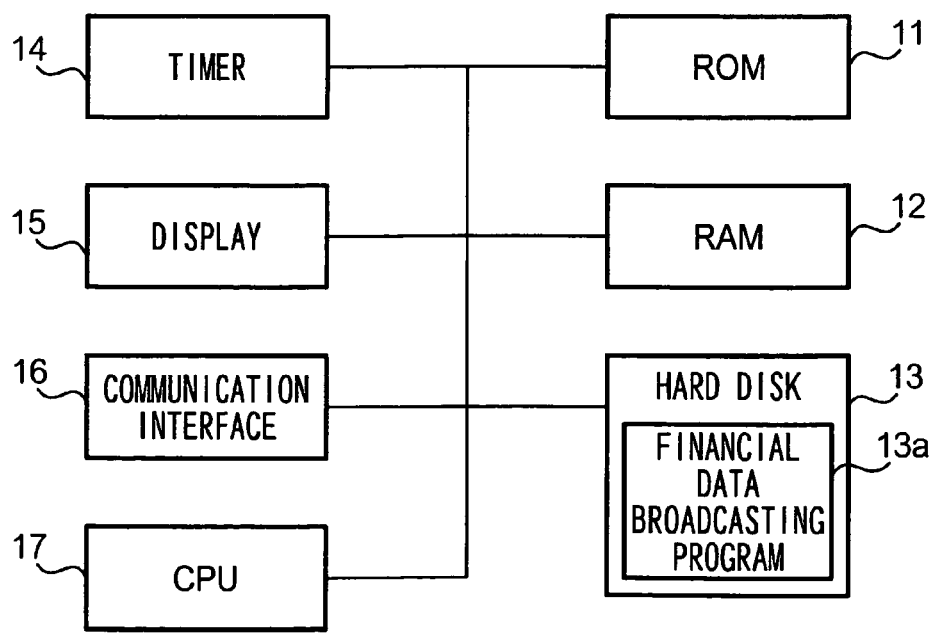
FIG. 2 illustrates a block diagram of hardware structure of a financial data broadcasting device.

FIG. 2 shows a block diagram of hardware structure of financial data broadcasting device 10. As shown in FIG. 2, financial data broadcasting device 10 comprises ROM 11 storing an initial program loader (IPL), RAM 12 used as a working area, hard disk 13 storing an operating system (OS) and financial data broadcasting program 13a, timer 14 for creating data indicating the current time, display 15, communication interface 16 and CPU 17 controlling these components of financial data broadcasting device 10.

When CPU 17 executes data processing following instructions provided by financial data broadcasting program 13a using RAM 12 as a working area, real-time financial data is generated and broadcasted to the computer network in predetermined time intervals.

Figure 3:
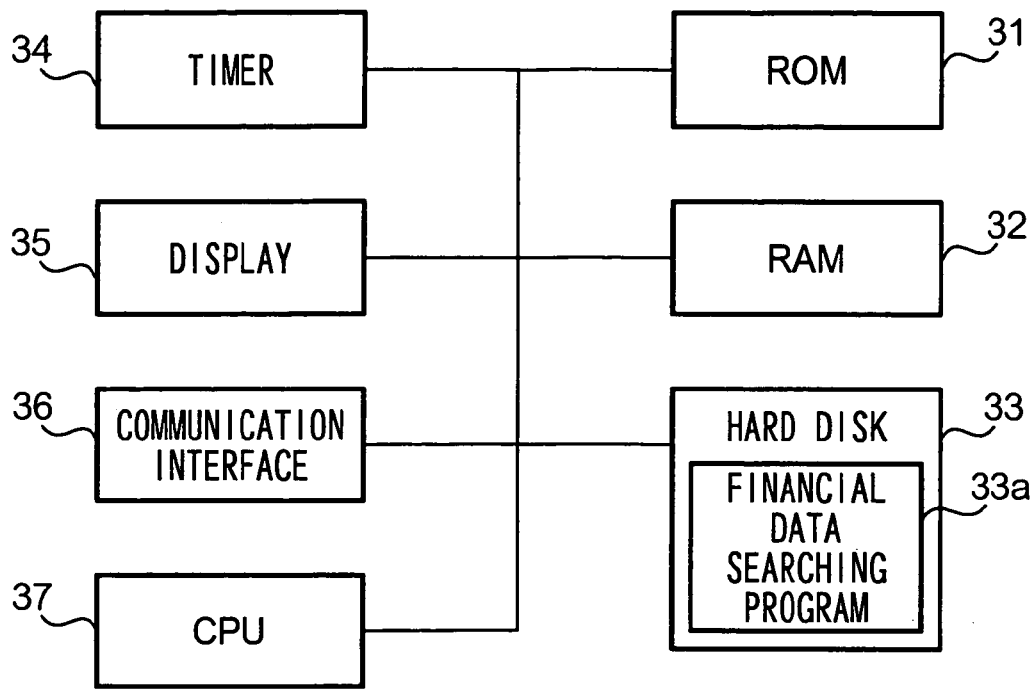
FIG. 3 illustrates a block diagram of hardware structure of a financial data searching device.

FIG. 3 shows a block diagram of hardware structure of financial data searching device 30. As shown in FIG. 3, financial data searching device 30 comprises ROM 31, RAM 32, hard disk 33, timer 34, display 35, communication interface 36 and CPU 37. Hard disk 33 stores financial data searching program 33a. When CPU 37 executes data processing following instructions provided by financial data searching program 33a using RAM 32 as a working area, financial data is obtained from entity 20 and content of the obtained financial data are displayed in display 35.

Figure 4:
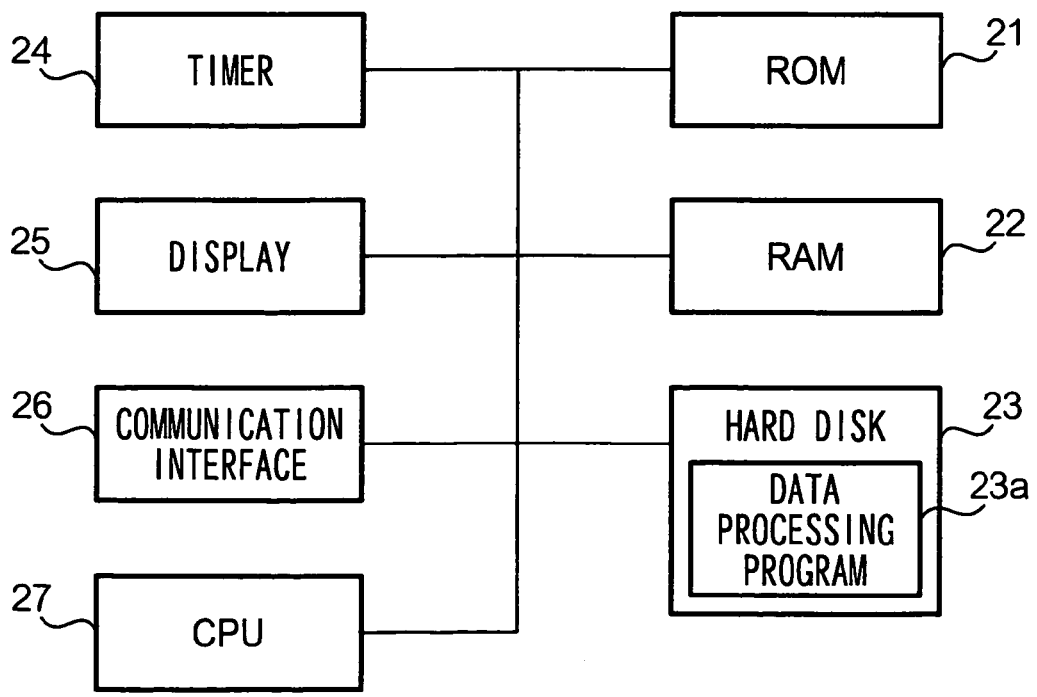
FIG. 4 illustrates a block diagram of hardware structure of an entity.

FIG. 4 shows a block diagram of hardware structure of entity 20. As shown in FIG. 4, each entity 20 comprises ROM 21, RAM 22, hard disk 23, timer 24, display 25, communication interface 26 and CPU 27. Hard disk 23 may store data processing program 23a for instructing CPU 27 to carry out specific processing of obtained financial data.

Entities 20 can be categorized into two types: entity 20 which carries out processing of financial data; and entity 20 which does not carry out processing of financial data.

Entity 20 in the first category carries out specific processing of financial data received from financial data broadcasting device 10, or from another entity 20 which is located at an upstream position, and newly generates financial data. Then entity 20 transmits the derived financial data along with time data indicating the current time and entity identifier identifying entity 20, to another node at a downstream position. Content of financial data processed by one entity 20 differs from that processed by another entity 20 according to content of data processing program 23a stored in each entity 20. For example, entity 20 may extract financial data with certain predetermined attributes from all received financial data and transmit the extracted financial data to a node at a downstream position; entity 20 may calculate a daily increase ratio of various stock prices on the basis of the obtained financial data, generate ranking data indicating stock prices in a descending order of daily increase ratio, and transmit the ranking data to a node at a downstream position; entity 20 may comprise obtained financial data and generate data indicating a stock price index; entity 20 may calculate logical numerical values on the basis of several numerical values indicated by obtained financial data, and generate data indicating the calculated logical numerical values.

On the other hand, entity 20 in the second category receives financial data, which may be derived financial data, from financial data broadcasting device 10 or from another entity 20 located at an upstream position, and transmits the received financial data along with time data indicating the current time and entity identifier identifying entity 20 to another node at a downstream position, without any processing of the financial data.

Next, example operations of the system according to the present embodiment will be described.

Figure 5:
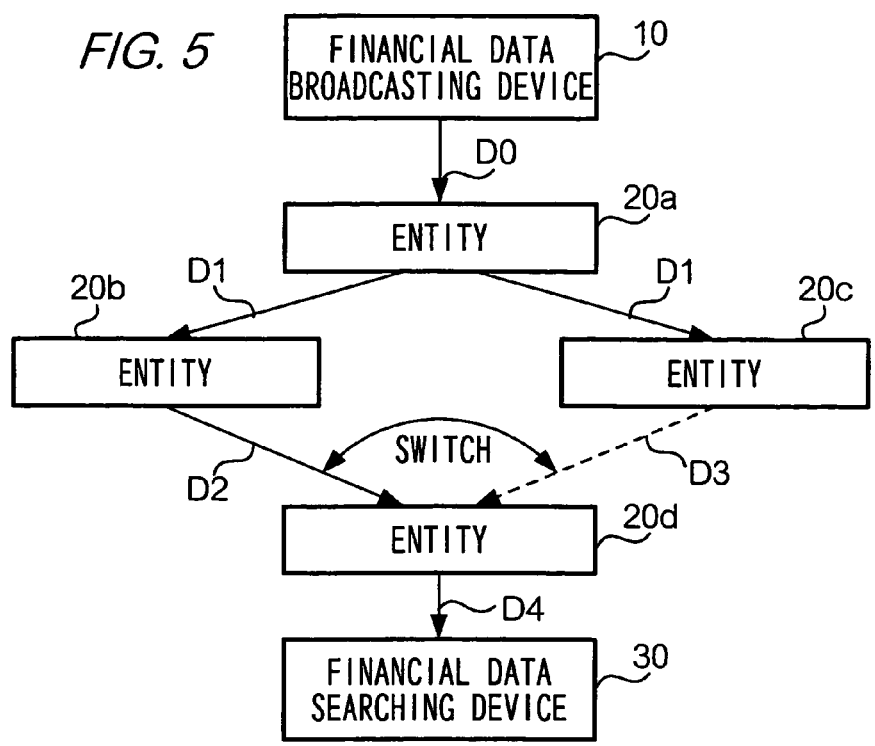
FIG. 5 illustrates relations among plural entities.

As explained above, in the present embodiment, financial data transmitted from financial data broadcasting device 10 reaches financial data searching device 30 via several entities 20, which form a route of data distribution with regard to the financial data. In the following explanation, for the purpose of simplicity, only relations among entities 20a, 20b, 20c and 20d shown in FIG. 5 are focused on. Entity 20a, which is located at an upstream position of entities 20b and 20c in FIG. 5, transmits the same content of data to both of entities 20b and 20c at the same time. Entity 20d, which is located at a downstream position of entities 20b and 20c, selects one of entities 20b and 20c, and receives data only from the selected entity 20. Now, it is assumed that entity 20d selects entity 20b as the entity from which entity 20d receives data. It is also assumed that a communication connection between entity 20d and financial data searching device 30 is established following a network protocol which is commonly used such as Hypertext Transfer Protocol (HTTP), or a network protocol which is prepared only for the system.

Under the conditions mentioned above, when any change occurs in trading conditions in the securities exchange, financial data broadcasting device 10 immediately transmits financial data D0 indicating the change to entity 20a.

Figure 6A:
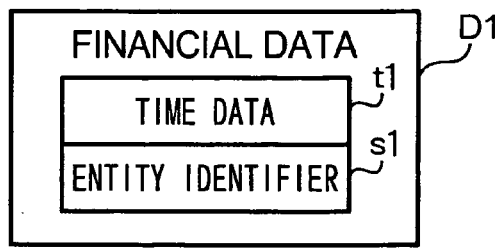
FIG. 6 illustrates example of content of a financial data.

When entity 20a receives financial data D0 from financial data broadcasting device 10, entity 20a adds time data t1 indicating the current time and entity identifier s1 identifying entity 20a to financial data D0 to generate financial data D1, and transmits financial data D1 to both of entities 20b and 20c. FIG. 6(a) shows an example of content of financial data D1 including time data t1 and entity identifier s1.

Figure 6C:
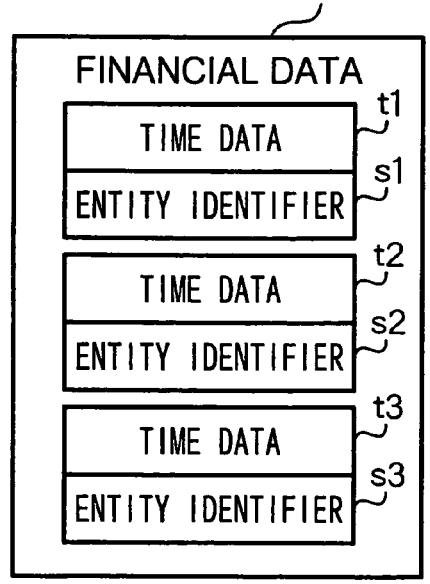
Figure 6B:
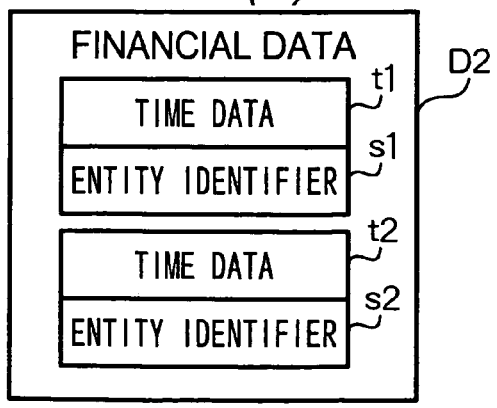

Entity 20b carries out specific processing of financial data D1, which is received from entity 20a, following instructions provided by data processing program 23a stored in entity 20b to generate financial data D2 which is financial data derived from financial data D1. Then, entity 20b adds time data t2 indicating the current time and entity identifier s2 identifying entity 20b to financial data D2, and transmits financial data D2 to entity 20d. FIG. 6(b) shows an example of content of financial data D2 including time data t1, entity identifier s1, time data t2 and entity identifier s2.

Entity 20c carries out specific processing of financial data D1, which is received from entity 20a, following instructions provided by data processing program 23a stored in entity 20c to generate financial data D3 which is financial data derived from financial data D1. Since there is no entity 20 at a position downstream of entity 20c, to which entity 20c should transmit financial data, entity 20c stores financial data D3 in RAM 22 or hard disk 23 of entity 20c without transmitting financial data D3 to any node in the network.

Entity 20d carries out specific processing of financial data D2, which is received from entity 20b, following instructions provided by data processing program 23a stored in entity 20d to generate financial data D4 which is financial data derived from financial data D2. Then, entity 20d adds time data t3 indicating the current time and entity identifier s3 identifying entity 20d to financial data D4, and transmits financial data D4 to financial data searching device 30. FIG. 6(c) shows an example of content of financial data D4 including time data t1, entity identifier s1, time data t2, entity identifier s2, time data t3 and entity identifier s3.

A communication connection is established between entity 20d and financial data searching device 30 following HTTP or another communication protocol as explained above, and entity 20d transmits 'keep alive' signals to financial data searching device 30 periodically, after a certain period of time passes without receiving any new financial data D2 from entity 20b, for the purpose of avoiding disconnection of the communication connection by financial data searching device 30.

Each time that entity 20d receives financial data D2 from entity 20b, entity 20d obtains time data t1 from financial data D2, calculates a time period between the time indicated by time data t1 and the current time, and stores data indicating the calculated time period in RAM 22 or hard disk 23 in a time series. Then, entity 20d evaluates the time periods indicated by the stored data and determines whether dispersion among the time periods exceeds a threshold value or whether the last time period exceeds a threshold value. When the result of the determination is affirmative, entity 20d stops receiving financial data from entity 20b and starts receiving financial data from entity 20c.

When financial data searching device 30 receives financial data D4, financial data searching device 30 determines whether there is critical delay of distribution of financial data D4 on the basis of each pair of time data and entity identifier included in financial data D4. More specifically, for example, financial data searching device 30 obtains from financial data D4 time data t1 in a pair with entity identifier s1 indicating entity 20a which is located at the highest upstream position, and when a time period between the time indicated by time data t1 and the current time exceeds a threshold value, financial data searching device 30 determines that financial data D4 was distributed with critical delay and is out of date. When financial data D4 is determined to be out of date, financial data searching device 30 displays in display 35 content of financial data D4 and a message stating that displayed financial data D4 is out of date.

Moreover, when financial data searching device 30 determines that financial data D4 was distributed with critical delay and the delay was caused by lack of ability, such as data processing speed and data communication speed, of financial data searching device 30, financial data searching device 30 may switch to another data transfer method which requires less resources; e.g. from a push-type data transfer method following a network protocol prepared only for the system to a pull-type data transfer method following a commonly used HTTP.

In the above explanation with reference of FIG. 5 and FIG. 6, entities 20b, 20c and 20d located at downstream positions of entity 20a carry out data processing of received financial data. When entities 20 which are located at downstream positions do not carry out data processing of received financial data, each of them adds time data and entity identifier to the received financial data and transmits the financial data to entity 20 located at a downstream position in the same way as entity 20 which carries out data processing of financial data does.

As is explained above, in the present embodiment, when each entity 20 relays financial data from a node at an upstream position to a node at a downstream position, it adds a pair of time data and entity identifier to the financial data. Accordingly, when financial data searching device 30 receives the financial data, it can obtain time data corresponding to each of nodes at upstream positions from the financial data, and thus determines easily whether the financial data was distributed with a critical delay by simply calculating a time period between time indicated by the time data and the current time.

Moreover, each entity 20 can also easily determine whether there was critical delay in distribution of financial data at any other entity 20 at an upstream position by calculating a time period between time indicated by the time data included in received financial data and the current time.

When there is a critical delay of distribution of financial data at any node at an upstream position, entity 20 can switch between entities 20 at upstream positions to form a steadier route for receiving financial data.

The present invention is not limited to the above embodiment, and it is possible to realize the present invention by modifying the above embodiment.

For example, in the above embodiment, each pair of time data and entity identifier which is added at each entity 20 is maintained in financial data until the financial data reaches financial data searching device 30 which is the last receiver of the financial data. It is also possible that, when each entity 20 determines that any pair of time data and entity identifier which is included in the financial data by any other entity 20 at an upstream position does not need to be kept in the financial data, entity 20 may delete the unnecessary pair of time data and entity identifier from the financial data and add a new pair of time data and entity identifier to the financial data.

What is claimed is:

1. A method for distributing financial data in a communication system having a data source from which financial data is transmitted, a terminal node for receiving the financial data and displaying a content of the financial data, and plural intermediate nodes located between the data source and the terminal node for relaying the financial data, comprising:

transmitting financial data from the data source to one of the plural intermediate nodes;

adding to the financial data, at one of the plural intermediate nodes, a pair of time data and an entity identifier, the time data indicating a current time which is obtained from an internal timer of the one of the plural intermediate nodes and the entity identifier identifying the one of the plural intermediate nodes;

transmitting the financial data from the one of the plural intermediate nodes to the terminal node directly or via one or more of the plural intermediate nodes;

calculating, at the terminal node, a time period between a time indicated by the time data of the one of the plural intermediate nodes and a current time which is obtained from an internal timer of the terminal node;

determining, at the terminal node, whether any critical delay in distribution of the financial data has occurred by comparing the calculated time period and a predetermined threshold time period; and notifying a user of the terminal node that the financial data is out of date when a determining means determines that the any critical delay in distribution of the financial data has occurred.

2. The method for distributing financial data of claim 1, further comprising:

adding to the financial data, at each of one or more of the plural intermediate nodes to which the financial data is transmitted from the one of the plural intermediate node to the terminal node, a pair of time data and an entity identifier, the time data indicating a current time which is obtained from an internal timer of the each of the one or more of the plural intermediate nodes and the entity identifier identifying the each of the one or more of the plural intermediate nodes;

calculating, at the each of the one or more of the plural intermediate nodes, a time period between a time indicated by the time data included by an intermediate node that is adjacent to the each of the one or more of the plural intermediate nodes upstream on a path of transmission of the financial data, and a current time which is obtained from an internal timer of the each of the one or more of the plural intermediate nodes; and determining, at the each of the one or more of the plural intermediate nodes, whether any critical delay in distribution of the financial data has occurred at the intermediate node that is adjacent to the each of the one or more of the plural intermediate nodes, by comparing the calculated time period and a predetermined threshold time period; and changing the path of transmission of the financial data, when it is determined that the any critical delay in distribution of the financial data has occurred at an intermediate node, so that the path does not include the intermediate node at which the critical delay occurred.

3. The method for distributing financial data of claim 1, further comprising:

processing the financial data at one of the plural intermediate nodes on a path of transmission of the financial data;

wherein each of one or more of the plural intermediate nodes downstream on the path of transmission of the financial data relays the financial data after the processing.

* * * * *